US009994194B2

(12) United States Patent
Greene

(10) Patent No.: US 9,994,194 B2
(45) Date of Patent: Jun. 12, 2018

(54) RECREATIONAL VEHICLE SERVICE COMPARTMENT SEALING SHROUD

(71) Applicant: Randy Greene, White Pine, TN (US)

(72) Inventor: Randy Greene, White Pine, TN (US)

(*) Notice: Subject to any disclaimer, the term of this patent is extended or adjusted under 35 U.S.C. 154(b) by 10 days.

(21) Appl. No.: 15/218,453

(22) Filed: Jul. 25, 2016

(65) Prior Publication Data

US 2017/0050619 A1 Feb. 23, 2017

Related U.S. Application Data

(60) Provisional application No. 62/208,283, filed on Aug. 21, 2015.

(51) Int. Cl.
| | | |
|---|---|---|
| *F16L 57/00* | (2006.01) | |
| *B60R 99/00* | (2009.01) | |
| *B60R 13/06* | (2006.01) | |
| *B60R 15/00* | (2006.01) | |
| *F16L 5/10* | (2006.01) | |

(52) U.S. Cl.
CPC .............. *B60R 99/00* (2013.01); *B60R 13/06* (2013.01); *B60R 15/00* (2013.01); *B60R 2099/005* (2013.01); *F16L 5/10* (2013.01)

(58) Field of Classification Search
CPC ...................................................... F16L 57/00
USPC ........................................... 138/110, 92, 109
See application file for complete search history.

(56) References Cited

U.S. PATENT DOCUMENTS

| | | |
|---|---|---|
| 6,661 A | 8/1849 | Decker |
| 463,890 A | 11/1891 | Cross |
| 549,419 A | 11/1895 | Wright |
| 1,138,946 A | 5/1915 | Elliott |
| 1,635,749 A | 12/1926 | Hosmer |
| 1,872,498 A | 8/1932 | Rasmusse |
| 2,237,680 A | 4/1941 | Mark |
| 2,258,941 A | 10/1941 | Wayman |
| 2,537,678 A | 1/1951 | Koetting |
| 2,812,959 A | 11/1957 | Fuller |
| 2,819,915 A | 1/1958 | Woodson |
| 2,919,147 A | 12/1959 | Nenzell |
| 2,946,525 A | 7/1960 | Thierer |
| 3,240,515 A | 3/1966 | Schmohl |
| 3,246,132 A | 4/1966 | Jordan |
| 3,761,114 A | 9/1973 | Blakeley |
| 3,934,904 A | 1/1976 | Hord |
| 3,982,703 A | 9/1976 | Meyers |
| 4,168,726 A * | 9/1979 | Klennert ................. F16L 59/02 138/178 |
| 4,228,978 A | 10/1980 | Rand |
| 4,722,556 A | 2/1988 | Todd |

(Continued)

FOREIGN PATENT DOCUMENTS

EP 603775 6/1994

*Primary Examiner* — James Hook

(74) *Attorney, Agent, or Firm* — Pitts & Lake, P.C.

(57) ABSTRACT

A sealing shroud is provided for blocking the port through a panel of the service compartment on an RV vehicle, or the like, through which the sewage outlet hose is connected to the external sewage line. This sealing shroud includes a pervious section preferably fabricated from a wire mesh which prevents rodents or other varmints from chewing an opening therein. The sealing shroud is carried by the external sewage line and blocks a rodent from entering into the RV through the space between the sewage line and the RV port.

9 Claims, 5 Drawing Sheets

(56) References Cited

U.S. PATENT DOCUMENTS

| | | | |
|---|---|---|---|
| 4,758,027 A | 7/1988 | Todd | |
| 4,796,926 A | 1/1989 | Rapsilver | |
| 4,835,405 A | 5/1989 | Clancey | |
| 4,881,662 A | 11/1989 | Tallman | |
| 5,023,959 A * | 6/1991 | Mercer | B60R 15/00 137/355.16 |
| 5,027,862 A * | 7/1991 | Laybourn | F16L 55/17 138/110 |
| 5,417,460 A | 5/1995 | Lunder | |
| 5,667,256 A | 9/1997 | Caine | |
| 5,687,773 A * | 11/1997 | Ryan | F01N 13/085 138/109 |
| 5,704,659 A | 1/1998 | Lunder | |
| 5,709,414 A | 1/1998 | Bailey | |
| 5,937,888 A | 8/1999 | McKiernan | |
| 5,971,444 A | 10/1999 | Hawkins | |
| 6,032,697 A * | 3/2000 | Kennedy | E03C 1/122 138/110 |
| 6,305,425 B1 * | 10/2001 | Korn | F16L 5/02 138/106 |
| 6,619,596 B1 | 9/2003 | Caine | |
| 6,516,836 B2 | 11/2003 | Fields | |
| 6,640,825 B2 * | 11/2003 | McAtarian | G01M 3/04 137/312 |
| 6,701,982 B1 * | 3/2004 | Ortiz | B67D 7/06 137/377 |
| 6,735,810 B2 | 5/2004 | Najm | |
| 6,761,380 B2 | 7/2004 | Pachciarz | |
| 6,786,462 B1 | 9/2004 | Bland | |
| 6,860,518 B2 | 3/2005 | Krauss | |
| 6,955,190 B2 * | 10/2005 | Koerner | F16L 11/10 138/110 |
| 7,036,524 B2 | 5/2006 | Kennedy | |
| 7,144,046 B1 | 12/2006 | Lape, Sr. | |
| 8,128,132 B2 | 6/2012 | Cravens | |
| 9,022,243 B2 | 5/2015 | Peteri | |
| 2003/0034650 A1 | 2/2003 | Krauss | |
| 2004/0164548 A1 | 8/2004 | Richey | |
| 2004/0262913 A1 * | 12/2004 | Anderson | E03F 1/00 285/61 |
| 2005/0217882 A1 | 10/2005 | Rizzuto | |
| 2008/0084032 A1 | 4/2008 | Cravens | |
| 2011/0005807 A1 * | 1/2011 | Chesnais | H02G 3/0481 174/120 R |
| 2011/0226790 A1 | 9/2011 | Peteri | |

* cited by examiner

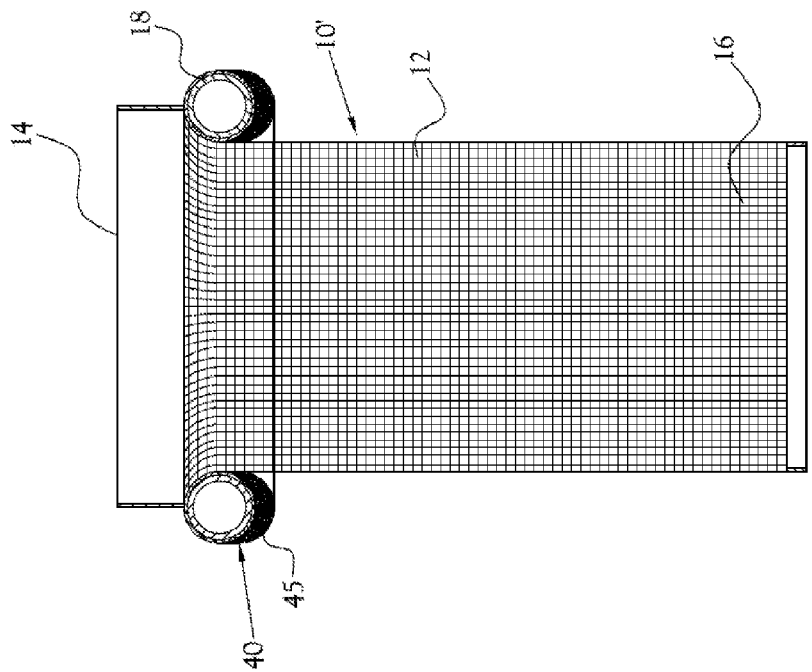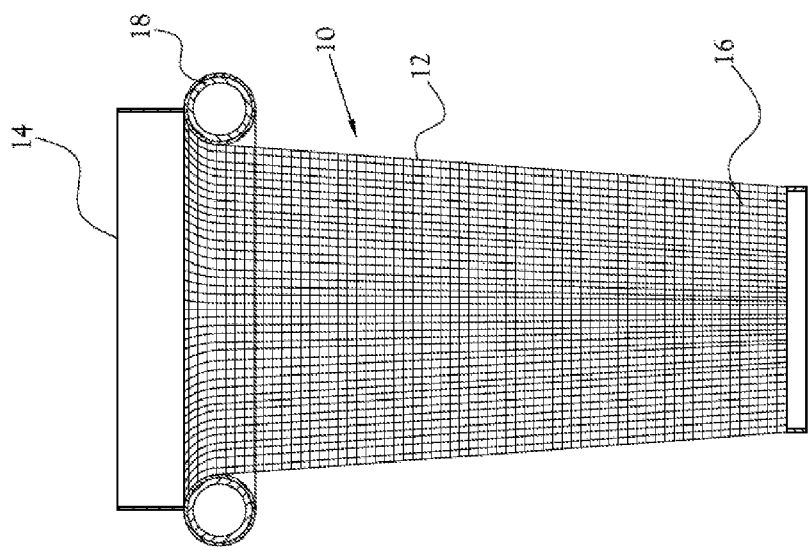

RECREATIONAL VEHICLE SERVICE COMPARTMENT SEALING SHROUD

CROSS-REFERENCE TO RELATED APPLICATIONS

This application claims the benefit of U.S. Provisional Patent Application No. 62/208,283, filed on Aug. 21, 2015, which is incorporated herein in its entirety by reference.

STATEMENT REGARDING FEDERALLY SPONSORED RESEARCH OR DEVELOPMENT

Not Applicable

BACKGROUND OF THE INVENTION

1. Field of Invention

The present invention generally relates to a recreational vehicle, ("RV") service compartment sealing shroud, referred to as a "sewage sock" in the above referenced provisional patent application, for blocking the port in a panel of the service compartment of a recreational vehicle through which a sewage hose connects to an external sewage line for discharging waste and waste water.

2. Description of the Related Art

In the camping industry, RV's are popular camping vehicles. As used herein, the term RV encompasses both motorized motorhomes, towables, i.e. campers that are towed behind a car, van or pickup, and truck-bed mounted campers that are often referred to in the art as wheel-less campers. As opposed to camping in a pitched tent, camping in an RV provides many of the conveniences of being at home or staying in a hotel. In this regard, in the field of RV's it is known that an RV typically provides kitchen, and frequently, bathroom facilities, along with electrical service for lights, heating, air-conditioning, and other electrical amenities, and may also provide cable and/or Wi-Fi access for television viewing and Internet access. Additionally, an RV frequently includes a storage tank for used water, often referred to as gray water, from the kitchen and bathroom facilities. This gray water storage must be dumped at a dumping station frequently found at campsites that accommodate RV's. Further, in addition to a central dumping station, many camping facilities that accommodate RV's have sewage connections at each campsite. These provisions require water lines, electrical and other utility line access, and a drain hose which is provided for draining gray water. These various lines and hoses will be generically referred to as "conduit" herein. These connections are often located in a service compartment that has external access.

Further, it is known that when a user of an RV is staying in a campground that provides for these types of "hook-ups," at each camp site, the RV may have various conduits extending through one or more panels in the service compartment for an extended period of time. It is known in the art, that these access points, which conveniently provide access to the RV's utility needs, also provide vermin, such as snakes, mice, rats, and/or insects, with access to the interior of the RV. This potential for vermin having access to the interior of the RV is both unsanitary, as vermin spread various diseases some of which are life-threatening, and can result in costly property damage. And, there are various devices known in the art which are intended to prevent the intrusion of vermin into the interior, habitable portions of an RV. For instance, U.S. Pat. No. 8,128,132, issued to Cravens on Mar. 6, 2012, discloses a pest control seal for an RV which comprises a relatively soft and resilient foam material which is compressed into the annular opening between a conduit and the passage in the wall or panel of the service compartment of the RV. According to Cravens, Cravens' seal also serves to preclude abrasion of the hose due to the hard edge of the surrounding hose passage. Further, Cravens' device must be secured by of fasteners, such as screws, which are driven into the panel of the service compartment. Additionally, U.S. Pat. No. 5,417,460 issued to Lunder on May 23, 1995, discloses an apparatus for attaching and securing a drain hose to the adapter used with an RV waste drain assembly. And, U.S. Pat. No. 4,758,027, issued to Todd on Jul. 19, 1988, discloses an adapter for coupling a flexible corrugated RV drainpipe to a sewage disposal site inlet.

What is missing from the art is a sewage shroud that substantially prevents entrance of vermin into the interior of an RV through the service compartment which is readily installable without the need for driving fasteners into the panels of the service compartment.

BRIEF SUMMARY OF THE INVENTION

A sealing shroud for blocking the port in a panel of the service compartment on an RV, or other type of vehicle, through which various conduits, such as the sewage outlet hose, pass is provided. The sealing shroud includes a pervious section, which extends between a connector end and a distal end. The pervious section of the illustrated sealing shroud defines an opening at each of these end portions. Further, the pervious section, in various exemplary embodiments can have either a cylindrical or a frusto-conical longitudinal section, i.e. the plane perpendicular to the circular member. Further, in an exemplary embodiment, the pervious section has a substantially circular cross-sectional area in the plane substantially parallel to the circular member. The pervious section is preferably fabricated from a material such as wire wool, wire mesh, or the like that is flexible but incorporates sharp edges if chewed so as to substantially prevent or discourage a mouse, rat, or other rodent from passing through it.

The circular member is carried by the connector end and defines a substantially circular opening for receiving the sewage line there through. This circular member can comprise a bent section of tubing or hose joined at its ends and joined with the connector end. The pervious section is passed through a port in a panel of the service compartment. In this regard, the circular member has a diameter larger than the diameter of the port, and since it is connected with the sealing shroud at an end thereof, the sealing shroud is prevented from being pulled through the port and further forms a snug fit proximate the perimeter of this port when the sealing shroud is in position.

The distal end of the sealing shroud extends below the panel and is secured to one of the conduits by a releasably securable strap. Moreover, the snug fit between the circular member and the perimeter of the port prohibits a rodent or other varmint from passing through this port proximate the circular member at the connector end. Thus, vermin are prevented from gaining access to the RV along the inside or outside of the sealing shroud through a port in a panel of the service compartment.

BRIEF DESCRIPTION OF THE SEVERAL VIEWS OF THE DRAWINGS

The above-mentioned features of the invention will become more clearly understood from the following detailed description of the invention read together with the drawings in which:

FIG. 2 is a cross-sectional view of the sealing shroud shown in FIG. 1;

FIG. 3 is a cross-sectional view of an alternate embodiment of the sealing shroud illustrated in FIG. 1;

DETAILED DESCRIPTION OF THE INVENTION

Figure 1:
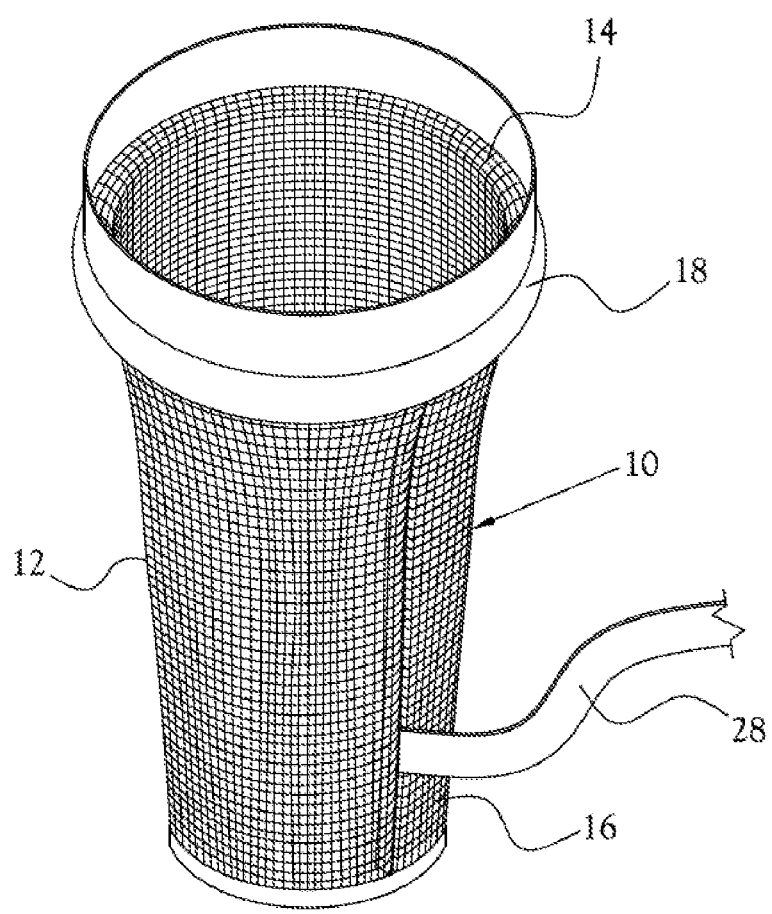
FIG. 1 is a perspective view of a service compartment sealing shroud constructed in accordance with various features of the invention.
Figure 4:
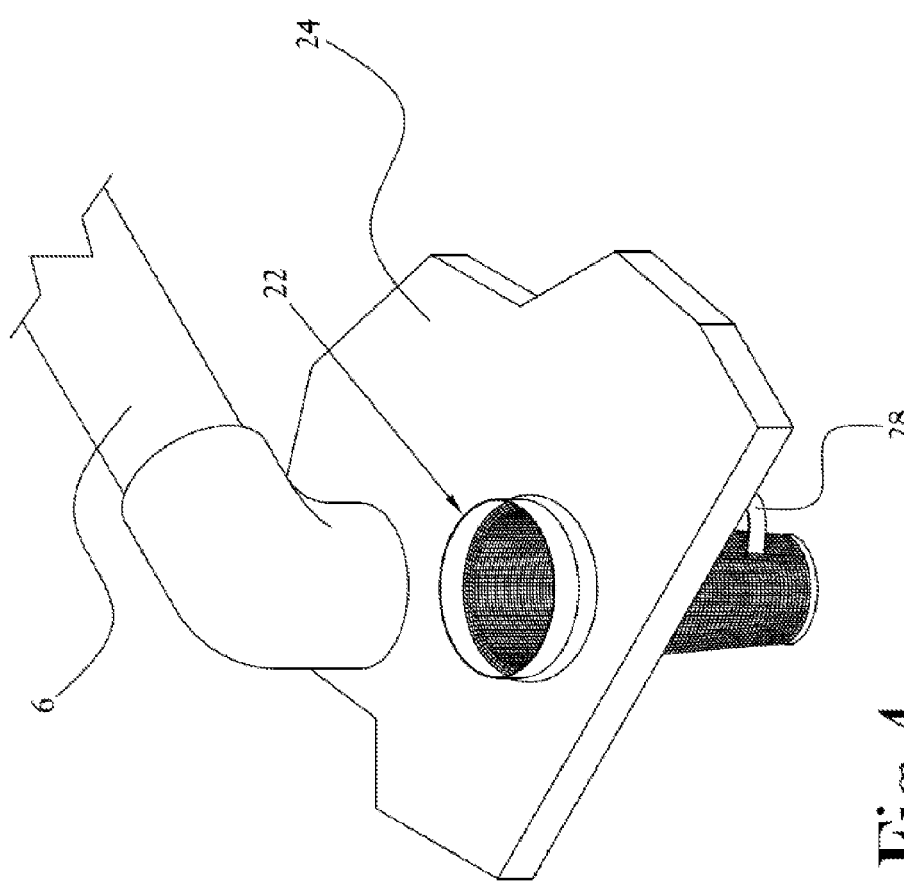
FIG. 4 illustrates the sealing shroud of the present invention extending through a port in a panel of the service compartment of an RV and positioned for receiving the sewage hose.

A sealing shroud for blocking the port in a panel of the service compartment on an RV, or other type of vehicle, through which the sewage outlet hose 6 is connected to the external sewage line is shown generally at 10 in FIG. 1. While sewage outlet hose 6 is illustrated, as described above, the present invention is intended for use with the various utility conduits that service an RV such as water lines, electrical and other utility lines that pass through a port in the service compartment. This sealing shroud 10 includes a pervious section 12 having a substantially circular cross-sectional area in the plane substantially parallel to the circular member 18. The pervious section 12 extends between a connector end 14 and a distal end 16. It will be noted in FIGS. 1 and 2 that the pervious section 12 of the illustrated sealing shroud 10 is, in one exemplary embodiment, tapered from the connector end 14 towards the distal end 16 and defines an opening at each of these end portions. The pervious section 12 is preferably fabricated from a material such as wire wool, wire mesh, or the like that is flexible but incorporates sharp edges that if chewed, would prevent or discourage a mouse, rat, or other rodent from passing through it. Further, the pervious section 12, in various exemplary embodiments, as stated above, can have a frusto-conical longitudinal section, as illustrated in FIG. 2, or, in a further exemplary embodiment, can have a substantially cylindrical longitudinal section, as illustrated in FIG. 3. It should be appreciated that, as used herein, longitudinal section as used herein refers to the plane that is perpendicular to the circular member 18. Further, in an exemplary embodiment, the pervious section has a substantially circular cross-sectional area A substantially circular member 18 is carried by the connector end 14 and defines a substantially circular opening for receiving the sewage line there through as is shown. This circular member 18 can comprise a bent section of tubing or hose joined at its ends and joined with the connector end 14. In an exemplary embodiment, illustrated in FIG. 3, sealing shroud 10' further includes a deformable annular pouch 40 depends from circular member 18 and is filled with a dense granular aggregate 45. Deformable annular pouch 40, in combination with the dense granular aggregate 45, provides additional weight to further stabilize sealing shroud 10'. Additionally, those skilled in the art will recognize that it is not uncommon for the panel of the service compartment to experience warpage through exposure to the elements. In this case, the deformable annular pouch 40 compensates for such warpage and enhances the sealing ability of sealing shroud 10'.

Figure 5:
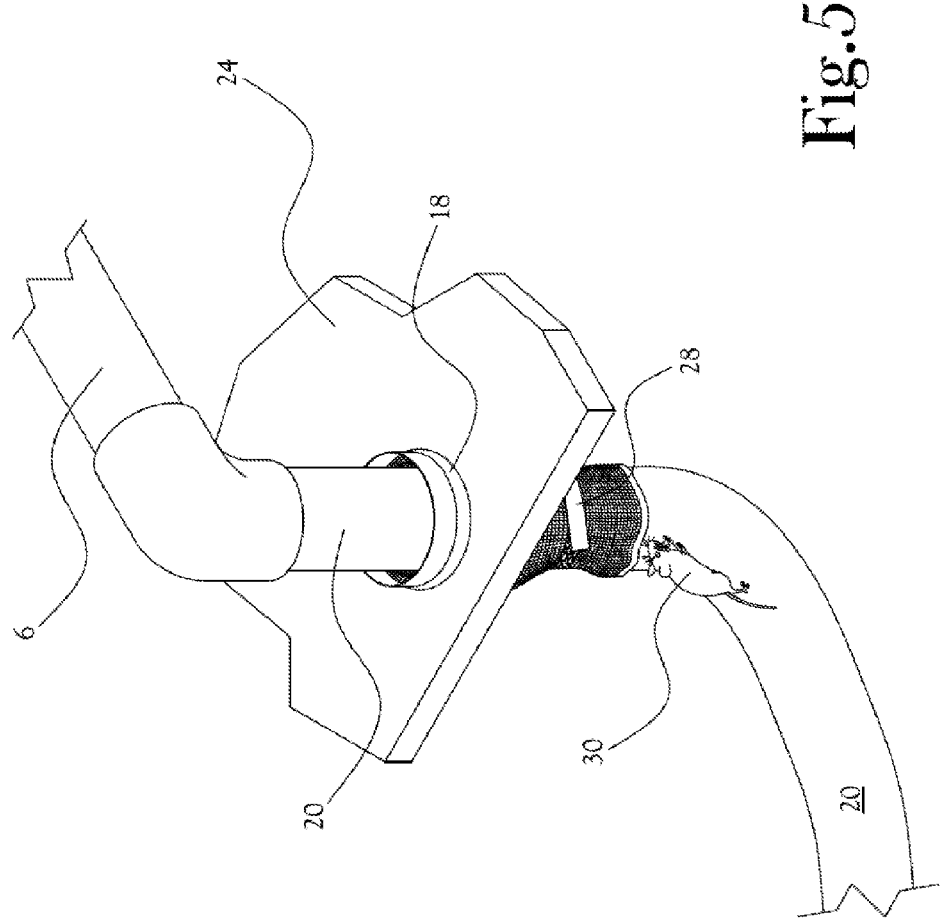
FIG. 5 shows the sealing shroud of FIG. 4 receiving the sewage line and secured thereto by a strap carried by the sealing shroud.

Sewage line 20 extends through the opening port 22 of the RV panel 24 as shown in FIG. 5. The circular member 18 has a diameter larger than the diameter of the opening port 22, and since it is connected with the sealing shroud 10 at connector end 14, the sealing shroud 10 is prevented from being pulled through the opening port 22 and further forms a snug fit proximate the perimeter of opening port 22 when the sealing shroud 10 is positioned as shown in FIG. 5. The distal end 16 of the sealing shroud 10 extends below the panel 24 and is secured by the strap 28 to the sewage line 20 as is shown in FIG. 5. By tightly securing the distal end 16 of the sealing shroud 10 to the sewage line 20, a rodent such as mouse 30 is unable to pass along the external portion of the sewage line 20 through the opening port 22 into the RV.

Figure 6:
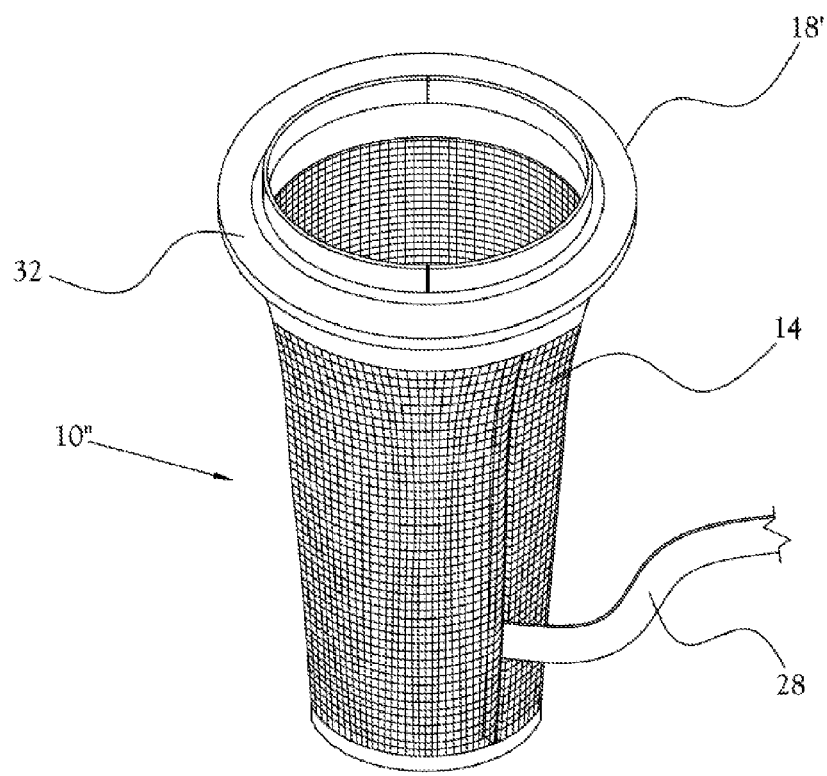
FIG. 6 illustrates an embodiment of the sealing shroud having a circular member having an alternate design.

Moreover, the snug fit between the circular member 18 and the perimeter of the opening port 22 prohibits a rodent or other varmint from passing through opening port 22 proximate the circular member 18 at the connector end 14. Thus, vermin are prevented from gaining access to the RV along the inside or outside of the sealing shroud 10 through opening port 22. An alternate embodiment of the sealing shroud 10" is shown in FIG. 6. In this embodiment of sealing shroud 10, the circular member 18 is secured to the connector end 14 of the sealing shroud 10. This circular member 18 is provided with a circular lip 32 which extends radially outwardly from circular member 18 to cover the circular portion of the panel 24 which defines the opening port 22. This circular lip 32 assists in preventing vermin from passing between the sealing shroud 10 and the opening port 22 and then into the RV.

What is claimed is:

1. A sealing shroud for blocking a port in a panel of a service compartment of an RV through which a utility conduit passes, the sealing shroud comprising:
   a pervious section having a substantially circular cross-sectional area having a connector end and a distal end, said pervious section being tapered from said connector end towards said distal end;
   a substantially circular member connected with said connector end and defining a substantially circular opening for receiving said conduit therethrough, said substantially circular member having a diameter greater than the port in the RV panel to prevent said member from being pulled therethrough;
   said distal end of said pervious section proportioned for receiving said conduit therethrough as it extends towards the connector end;
   a strap carried proximate said distal end to secure said sealing shroud to said conduit; and
   a deformable annular pouch depending from said circular member, wherein said deformable annular pouch is filled with a dense granular aggregate, whereby stability of said sealing shroud is enhanced.

2. The sealing shroud of claim 1 wherein said sealing shroud has a frusto-conical longitudinal section.

3. The sealing shroud of claim 1 wherein said sealing shroud has a substantially cylindrical longitudinal section.

4. A sealing shroud for blocking a port in a panel of a service compartment of an RV through which a utility conduit passes, the sealing shroud comprising:
   a pervious section having a substantially circular cross-sectional area having a connector end and a distal end;
   a substantially circular member connected with said connector end and defining a substantially circular opening for receiving said conduit, said substantially circular member having a diameter greater than said port in the RV panel to prevent said substantially circular member from being pulled therethrough; wherein said circular member has a circular lip extending radially therefrom to assist in covering the space between the substantially circular member and the port in the panel when said sealing shroud is mounted thereon;

said distal end of said pervious section proportioned for receiving the conduit therethrough as it extends towards the connector end;

a strap carried proximate said distal end to secure said sealing shroud to said conduit; and a deformable annular pouch depending from said circular member, wherein said deformable annular pouch is filled with a dense granular aggregate, whereby stability of said sealing shroud is enhanced.

5. The sealing shroud of claim 4 wherein said sealing shroud has a frusto-conical longitudinal section.

6. The sealing shroud of claim 4 wherein said sealing shroud has a substantially cylindrical longitudinal section.

7. A sealing shroud for blocking a port in a panel of a service compartment of an RV through which a utility conduit passes, the sealing shroud comprising:

a pervious section having a substantially circular cross-sectional area having a connector end and a distal end;

a substantially circular member connected with said connector end and defining a substantially circular opening for receiving said conduit therethrough, said substantially circular member having a diameter greater than the port in the RV panel to prevent said member from being pulled therethrough;

a deformable annular pouch depending from said circular member, wherein said deformable annular pouch is filled with a dense granular aggregate, whereby stability of said sealing shroud is enhanced;

said distal end of said pervious section proportioned for receiving said conduit therethrough as it extends towards the connector end; and a strap carried proximate said distal end to secure said sealing shroud to said conduit.

8. The sealing shroud of claim 7 wherein said sealing shroud has a frusto-conical longitudinal section.

9. The sealing shroud of claim 7 wherein said sealing shroud has a substantially cylindrical longitudinal section.

\* \* \* \* \*